United States Patent
Ayandeh

(10) Patent No.: US 6,914,902 B2
(45) Date of Patent: Jul. 5, 2005

(54) DISTRIBUTED SEMI-REARRANGEABLE NON-BLOCKING ALGORITHM FOR CLOS NETWORKS

(75) Inventor: Siamack Ayandeh, Concord, MA (US)

(73) Assignee: Opal Acquisition Corporation, Bedford, MA (US)

(*) Notice: Subject to any disclaimer, the term of this patent is extended or adjusted under 35 U.S.C. 154(b) by 77 days.

(21) Appl. No.: 10/123,697

(22) Filed: Apr. 16, 2002

(65) Prior Publication Data

US 2003/0193938 A1 Oct. 16, 2003

(51) Int. Cl.[7] .............................................. H04L 12/50
(52) U.S. Cl. ....................... 370/372; 370/380; 370/388
(58) Field of Search ................................. 370/360, 367, 370/369, 372, 375, 376, 380, 386, 388

(56) References Cited

U.S. PATENT DOCUMENTS

| | | | | |
|---|---|---|---|---|
| 4,394,541 A | * | 7/1983 | Seiden ....................... 340/2.22 |
| 5,276,425 A | * | 1/1994 | Swanson et al. ........... 340/2.22 |
| 5,450,074 A | * | 9/1995 | Yoshifuji .................... 340/2.22 |
| 5,495,476 A | * | 2/1996 | Kumar ........................ 370/388 |
| 5,754,120 A | * | 5/1998 | Argentati ................... 340/2.22 |
| 5,801,641 A | * | 9/1998 | Yang et al. ................. 340/2.22 |

OTHER PUBLICATIONS

*A Rearrangement Algorithm for Three–Stage Switching* by Satoru Ohta et al., *Electronics and Communications in Japan*, Part 1, vol. 70, No. 9, 1987.

*A Simple Control Algorithm for Rearrangeable Switching Networks with Time Division Multiplexed Links* by Satoru Ohta, *IEEE Journal on Selected Areas in Communications*, vol. SAC–5, No. 8, Oct. 1987.

*Semi–Rearrangeably Nonblocking Operation of Clos Networks in the Multirate Environment* by Fotios K. Liotopoulos et al., *IEEE/ACM Transactions on Networking*, vol. 4, No. 2, Apr. 1996.

*Clos Networks, Benes Networks, and Introduction to Routing Algorithms* by Bill Dally, EE482: Advanced Computer Organization, Lecture # 5, Interconnection Networks Architecture and Design, Stanford University, Apr. 18, 2001.

*Wide–Sense Nonblocking Clos Networks under Packing Strategy* by Yuanyuan Yang et al., Department of Computer Science and Electrical Engineering, University of Vermont, Burlington, VT and GTE Laboratories, Waltham, MA.

*A New Decomposition Algorithm for Rearrangeable Clos Interconnection Networks*, By Hyun Y. Lee et al., *IEE Transactions on Communications*, vol. 44, No. 11, Nov. 1996.

*Synchronous Optical Network (SONET)—Automatic Protection Switching*, American National Standard for Telecommunications, T1.105.01–200 (Revision of T1.105.01–1998).

* cited by examiner

*Primary Examiner*—Chau Nguyen
*Assistant Examiner*—Soon D. Hyun
(74) *Attorney, Agent, or Firm*—Gordon & Jacobson, PC

(57) ABSTRACT

A marching algorithm for the selection of middle stage switch elements in a network uses an arbitrary but settled sequence in which middle stage switch elements are sampled. The sequence is applied in the forward direction to find an appropriate middle stage switch element during connection and in a reverse direction during disconnection to find an appropriate middle stage switch element for rearrangement. All of the input switch elements use the same marching sequence. The marching algorithm is applicable to both single rate and multi-rate connections. In the case of multi-rate connections, multiple rearrangements may occur at disconnect to match the capacity of the terminated connection.

24 Claims, 4 Drawing Sheets

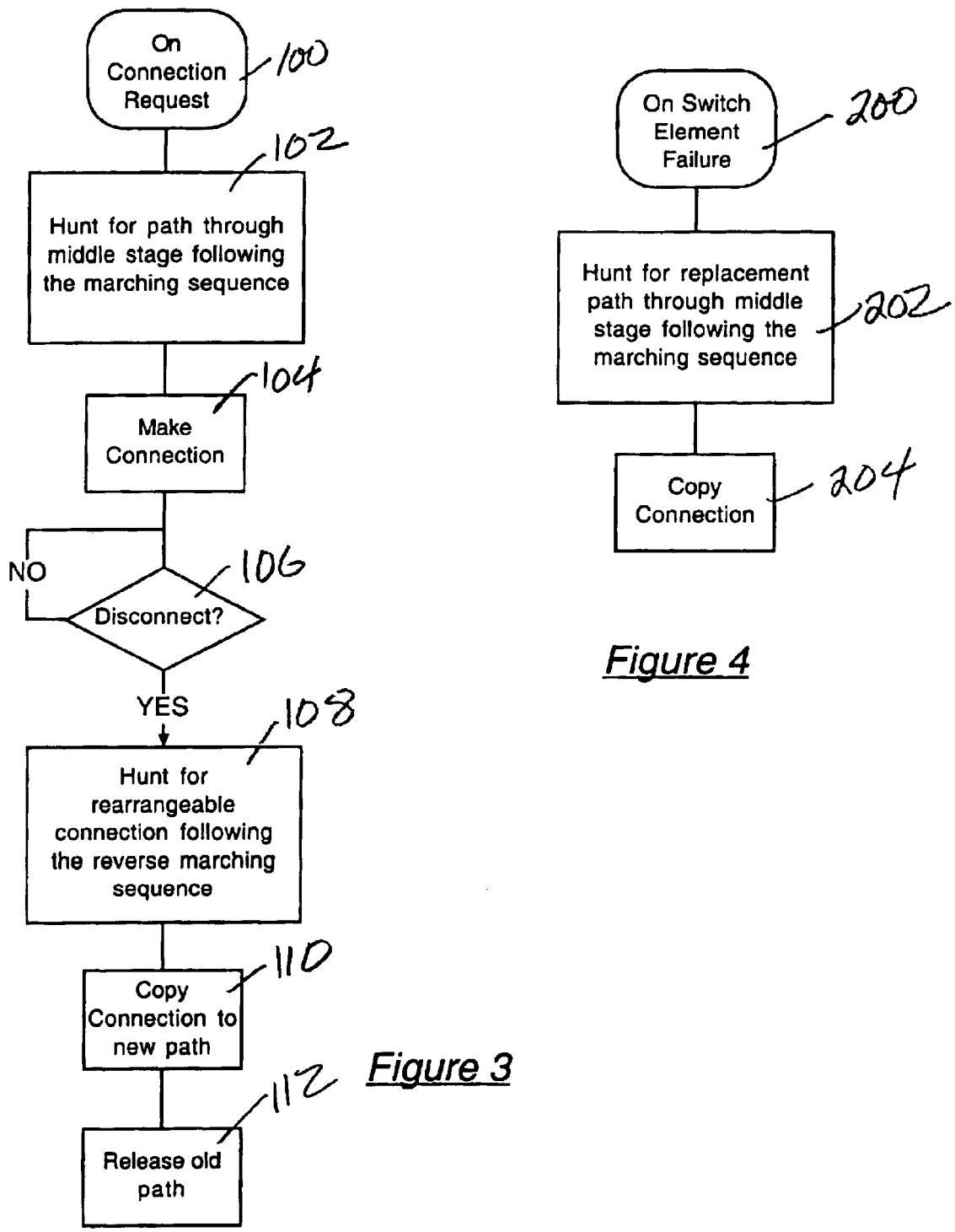

DISTRIBUTED SEMI-REARRANGEABLE NON-BLOCKING ALGORITHM FOR CLOS NETWORKS

BACKGROUND OF THE INVENTION

1. Field of the Invention

The invention relates to telecommunications networking. More particularly, the invention relates to an algorithm for selecting middle stage switch elements when setting up a connection in a Clos network.

2. State of the Art

There are two types of telecommunications networks: packet networks and switched networks. In a packet network there is no direct connection between a sender and a receiver. All users of a packet network have an address and information is transferred among users in packets which contain the address of the receiver. In a switched network, a discrete physical connection is established between network users and information flows between users in a stream. The earliest switched networks were the Bell Telephone System and others like it, now known as the public switched telephone network (PSTN). One of the earliest devices for automatically connecting (network switching) one telephone user to another telephone user is known as the crossbar switch.

A crossbar switch has a plurality of vertical paths and a plurality of horizontal paths with a switch (e.g. a relay) at each crossing point such that any one of the vertical paths can be connected to any one of the horizontal paths. Crossbar switches are still very much in use today although the new crossbar switches are microelectronic rather than electromechanical like the original crossbar switches. In a network having many users, crossbar switches are interconnected in stages to form a matrix where there are middle switch elements and end switch elements. The end switch elements are usually referred to as input switch elements and output switch elements. Such a network of interconnected crossbar switches is usually called a "Clos" network, named after the Bell Systems engineer who proposed a non-blocking network of crossbar switches. See, Clos, C., "A Study of Non-blocking Switching Networks", Bell Systems Technical Journal, Vol. 32, pp. 406–424, March 1953. The Clos network architecture is still in use today in modern optical networks and in wireless networks.

A simplified three stage Clos network is illustrated in prior art FIG. 1. The network shown in FIG. 1 has four input stage switch elements, each having 3×3 ports, four output stage switch elements, each having 3×3 ports, and three middle stage switch elements each having 4×4 ports. In a real network, the number of ports and the number of switch elements would be much larger. It is also common to have a network switch with more than three stages. However, the general architecture of a three stage Clos network having an equal number of input and output ports can be expressed as: r number of n×m input stage switch elements, m number of r×r middle stage switch elements and r number of m×n output stage switch elements. In this arrangement, there is exactly one link between every two switch elements in consecutive stages. The general notation for such a network is v(m,n,r). For a given n and r, varying the number m will alter the connecting capability of the network. From FIG. 1, it will be appreciated that there can easily arise a condition where one of the input switch elements cannot be connected to a desired output switch element. For example, if input switch 1 selects middle switch 1 to connect to output switch 2 and any one or more input switch elements use middle switch elements 2 and 3 to connect to output switch element 1, there is no path available for input switch element 1 to connect to output switch element 1. It will also be appreciated that, with prescience, the middle switch elements could be selected in such a way that blocking of connections is minimized.

Clos showed that a v(m,n,r) network is "strictly non-blocking" if the number of middle stage switch elements $m \geq 2n-1$. If the network satisfies this condition, any middle switch element may be chosen arbitrarily to make a connection without blocking the switch. A strictly non-blocking network requires either "overbuild" of the middle stages or idle ports on the input and output stages. It is, therefore, an inefficient use of hardware.

Benes showed that a v(m,n,r) network is "rearrangeable" if the number of middle switch elements $m \geq n$. See, Benes, V. E., "The Mathematical Theory of Connecting Networks and Telephone Traffic", Academic Press New York, 1965. If the network satisfies this condition, a connection request can always be met but it may require rearrangement of an existing connection in the network. However, rearrangement disrupts the existing connection and delays the requested connection for "path routing".

Benes proposed an intelligent routing control strategy as a compromise between "strictly non-blocking" and "rearrangeable" networks. A network is called "wide-sense non-blocking" if the number of middle switch elements m satisfies $2n-1 \geq m \geq n$ and a routing algorithm ("strategy") is employed. Different strategies require different numbers of middle stage switch elements. A commonly used control strategy for wide-sense non-blocking networks is known as "packing" strategy. A wide-sense non-blocking network using packing strategy is also known as "semi-rearrangeably non-blocking".

Under packing strategy, a connection is realized on a path found by trying the most used part of the network first and the least used part last. For a v(m; n; r) network, this means that when choosing a middle switch for satisfying a connection request, an empty middle switch is not used unless there is not any partially filled middle switch that can satisfy this connection request. Packing strategy can also be combined with "repacking".

Repacking means when a connection is released one or more existing connections are moved to the most used part of the network. Repacking is essentially a type of rearrangement although the rearrangement is performed at the time a connection is released not at the time a connection is established. It is generally believed that packing/repacking can improve network performance and reduce network cost.

Packing and repacking algorithms can be even more complicated where a time division multiplexed (TDM) signal enters an input port and is demultiplexed at the input switch element such that different time slots are directed to different output ports through different middle stage switch elements. The algorithms are further complicated by multi-rate versus single rate connections.

Ohta proposed a simple control algorithm (SCA) which is semi-rearrangeable in the sense that only a single connection is rearranged upon a disconnect for single rate connections, while following a path hunt algorithm at connection setup. See, Ohta S, "A Simple Control Algorithm for Rearrangeable Switching Networks with TDM links", IEEE JSAC, Vol. SAC-5, No. 8, October 1987. The key factor regarding the SCA, and other similar algorithms is the required expansion in the middle stage of the network or idle ports at the input and output stages to achieve non-blocking operation. In either case network capacity is less than full, i.e. in no case are all of the ports and all of the switch paths active.

In Ohta's control algorithm, $C(I, J, K)$ denotes the number of active connections (or time slots) for each respective link in the case of single rate connections, between first stage input switch I, third stage output switch J, and middle stage switch element K. The control algorithm requires that:

1. On connection request, a middle stage switch element K is selected such that $C(I, J, K) = \min_p C(I, J, p)$;
2. On disconnect of a connection between $(I, J)$ through middle stage switch element K, and given $C(I, J, K)$, do not execute re-arrangement if $C(I, J, K)$ is equal to $\max_p C(I, J, p)$ before the disconnect. Otherwise rearrange a connection $C(I, J, K')$ that satisfies $C(I, J, K') = \max_p C(I, J, p)$.

This algorithm has also been applied to multi-rate connections. The range of switch capacity for which the SCA algorithm is non-blocking has been derived and mathematically proven. The algorithm is particularly limited for the multi-rate applications, especially when the ratio between the lowest and the highest rate connections is large. In typical networks this ratio is several hundred and thus further reduces the range of network capacities for which the semi-rearrangeable algorithm is operationally useful. See, Liotopoulos, F. K., Chalasani, S., "Semi—rearrangeably Non-blocking Operation of Clos Networks in the Multirate Environment," IEEE/ACM Trans. on Networking, Vol. 4, No. 2, April 1996.

The SCA is a distributed algorithm in the sense that each input stage switch element only requires knowledge of two parameters:

(a) $C(I, J, K)$—the number of connections or timeslots from first stage switch element I, to third stage switch element J, through switch element K (required to determine $\min_p C(I, J, p)$); and (b)

$$\sum_{\forall I} C(I, J, K)$$

—the sum of $C(I, J, K)$ values for all first stage switch elements (required to determine if a middle stage switch element K has a free slot to set-up a connection between (I, J) through middle stage switch element K.

Typically, the parameter described in (a) is locally available to each input stage switch element individually, while the parameter described in (b) reflects the status of a remote shared resource, e.g. the output port capacity of a middle stage switch element. The parameter in (b) can be discovered in one of two ways: through an explicit distribution mechanism, or by implicit connection attempts. In the latter case an input switch element simply attempts to make a connection through a sequence of middle stage switches, until it succeeds. However, the sequence in which these attempts are made is determined by the SCA algorithm, and independently for each input stage switch element.

The disadvantages of the prior art can be summarized as follows. No state of the art algorithm makes full use of the network while providing non-blocking operation. Although some algorithms can be implemented in a distributed fashion, not all can. The state of the art algorithms do not work well setting up large ratio multi-rate connections.

SUMMARY OF THE INVENTION

It is therefore an object of the invention to provide a semi-rearrangeable non-blocking algorithm for Clos networks.

It is also an object of the invention to provide a semi-rearrangeable non-blocking algorithm for Clos networks which may be implemented in a distributed fashion.

It is another object of the invention to provide a semi-rearrangeable non-blocking algorithm for Clos networks which makes full use of the network while operating in a non-blocking manner.

It is still another object of the invention to provide a semi-rearrangeable non-blocking algorithm for Clos networks which facilitates the setting up of large ratio multi-rate connections.

In accord with these objects which will be discussed in detail below, the present invention implements a marching algorithm for the selection of middle stage switch elements in a network having an equal number of switch elements at each stage. (Although the algorithm can be applied to networks which do not have the same number of elements at each stage, equal numbers of switch elements at each stage is the most difficult case for any path hunt algorithm.) The marching algorithm involves an arbitrary but settled sequence in which middle stage switch elements are sampled. The sequence is applied in the forward direction to find an appropriate middle stage switch element during connection and in a reverse direction during disconnection to find an appropriate middle stage switch element for rearrangement. All of the input switch elements use the same marching sequence. During rearrangement, the rearranged connection is "copied" to the new route before the old route is released. The marching algorithm is a distributed algorithm as each input stage switch element is provisioned once with the forward and its reverse marching sequences. Subsequent path hunt decisions are made independently, and are followed by connection requests that only rely on the knowledge of availability of timeslots at the middle stage for the desired destination. The marching algorithm is applicable to both single rate and multi-rate connections. In the case of multi-rate connections, multiple rearrangements may occur at disconnect to match the capacity of the terminated connection.

According to a presently preferred embodiment, the control algorithm notes the last middle stage switch element, $K_n$, that was successfully used for connecting (I, J). This element is then used as the starting point of the marching search. In addition, each first stage switch element knows the middle stage switch element $K_n$ for which a connection was last made. This element is then used as the starting point in the reverse sequence.

Additional objects and advantages of the invention will become apparent to those skilled in the art upon reference to the detailed description taken in conjunction with the provided figures.

BRIEF DESCRIPTION OF THE DRAWINGS

FIG. 3 is a flowchart illustrating one embodiment of the methods of the invention;

FIG. 4 is a flowchart illustrating another embodiment of the methods of the invention.

DETAILED DESCRIPTION OF THE PREFERRED EMBODIMENTS

Figure 1:
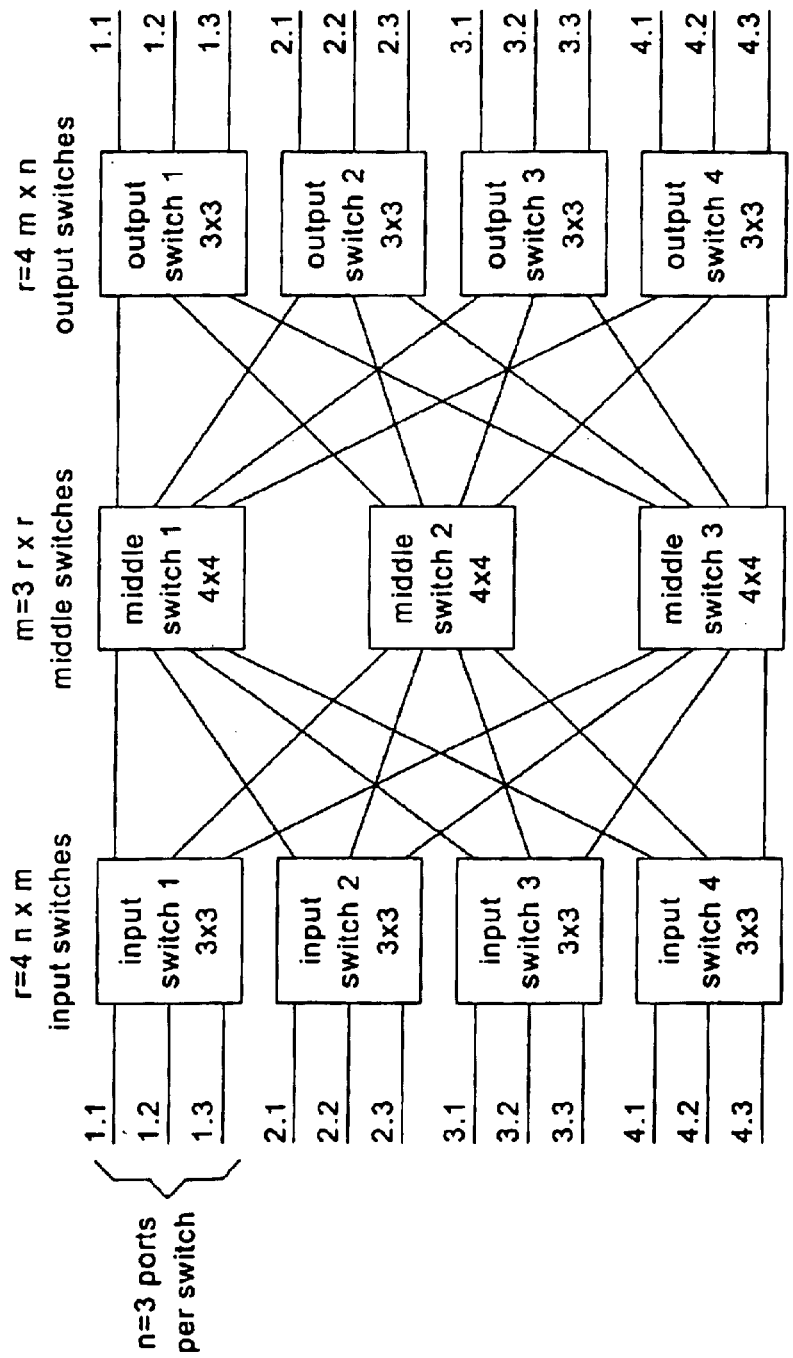
FIG. 1 is a simplified diagram of a prior art Clos network.
Figure 2:
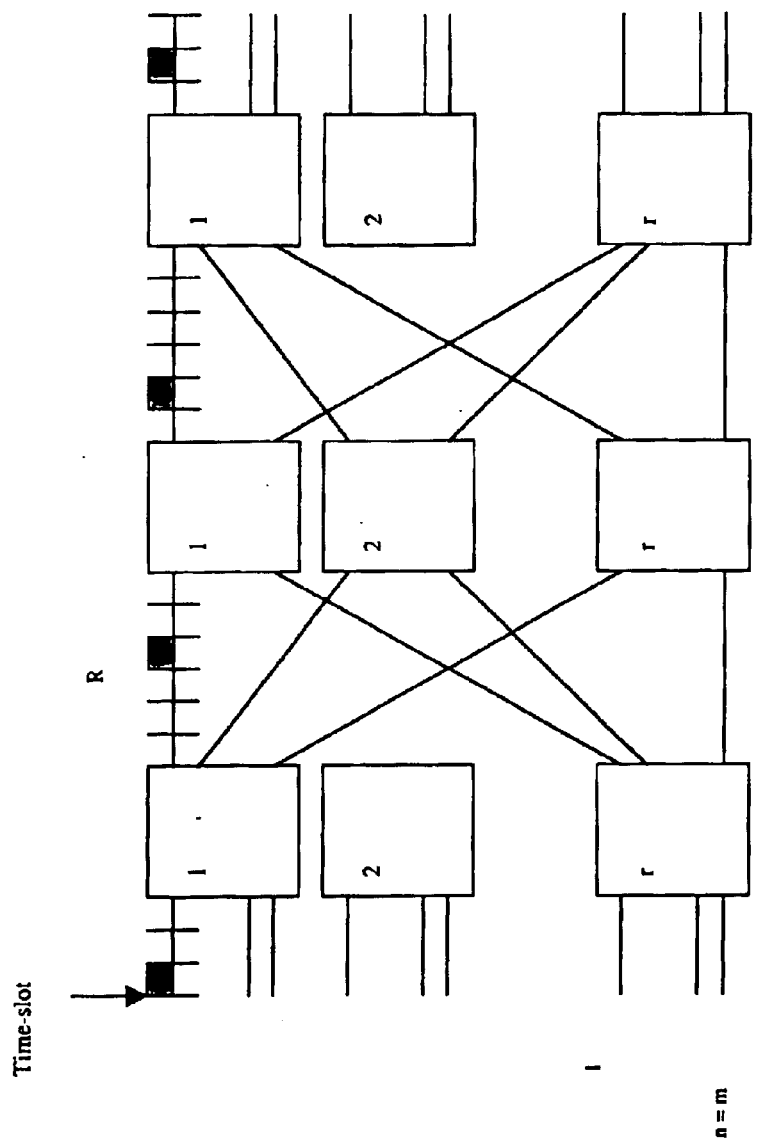
FIG. 2 is a simplified diagram of a preferred n=m=r Clos network for use with the marching algorithm of the invention.

The algorithm of the present invention is preferably implemented in a Clos network having an equal number of switch elements at each stage. For example, FIG. 2 illustrates a suitable three stage Clos network where n=m=r. According to the invention, the algorithm is suitable for switching TDM traffic from an input switch element to one or more middle stage switch elements to one or more output stage switch elements. FIG. 2 illustrates a TDM signal with R number of time slots being routed from the first input stage switch element to the first output stage switch element via the first middle stage switch element.

According to a first embodiment of the invention, suitable for single rate connections, upon a connection request, a marching algorithm is used to select the middle stage switch element which will be used to complete the connection. The marching algorithm maintains a sequence of middle stage switch element identifiers referred to as the "marching sequence". This sequence, while arbitrary, is the same for all the input switch elements. Using Ohta's notation, an example of a suitable marching sequence is $\{K_1, K_2, \ldots, K_r\}$, i.e. the middle stage switch elements from top to bottom in order. Using the marching sequence, the marching algorithm operates as follows:

Referring now to FIG. 3, on a connection request (I, J) at 100, the middle stage switch element K is selected by an input stage switch element following the marching sequence in the forward direction at 102, i.e. the "forward marching sequence", until a free timeslot for the connection to the destination switch element is found and the connection is made at 104.

On a disconnect at 106, the input switch element attempts to rearrange a single connection using a "reverse marching sequence", e.g. $\{K_r, \ldots, K_2, K_1\}$ at 108. According to the preferred embodiment, each first stage switch element knows the middle stage switch $K_n$ for which a connection was last made and that switch is used as the starting point in the reverse marching sequence. More particularly, once a disconnect request is issued for connection $(I, J, K)_x$, a single connection rearrangement occurs. This involves selection of a connection $(I, J, K')_y$ for rearrangement. Connection y is then copied over at 110 to the timeslots previously used by connection x. Note that K' may be the same as K, in which case a simple disconnect occurs. The old path is then released at 112.

From the foregoing, it will be appreciated that the marching algorithm of the invention is clearly a distributed algorithm as each input stage switch element is provisioned once with the forward and reverse marching sequences. Subsequent path hunt decisions are made independently, and are followed by connection requests that only rely on the knowledge of availability of timeslots at the middle stage for the desired destination.

Figure 5:
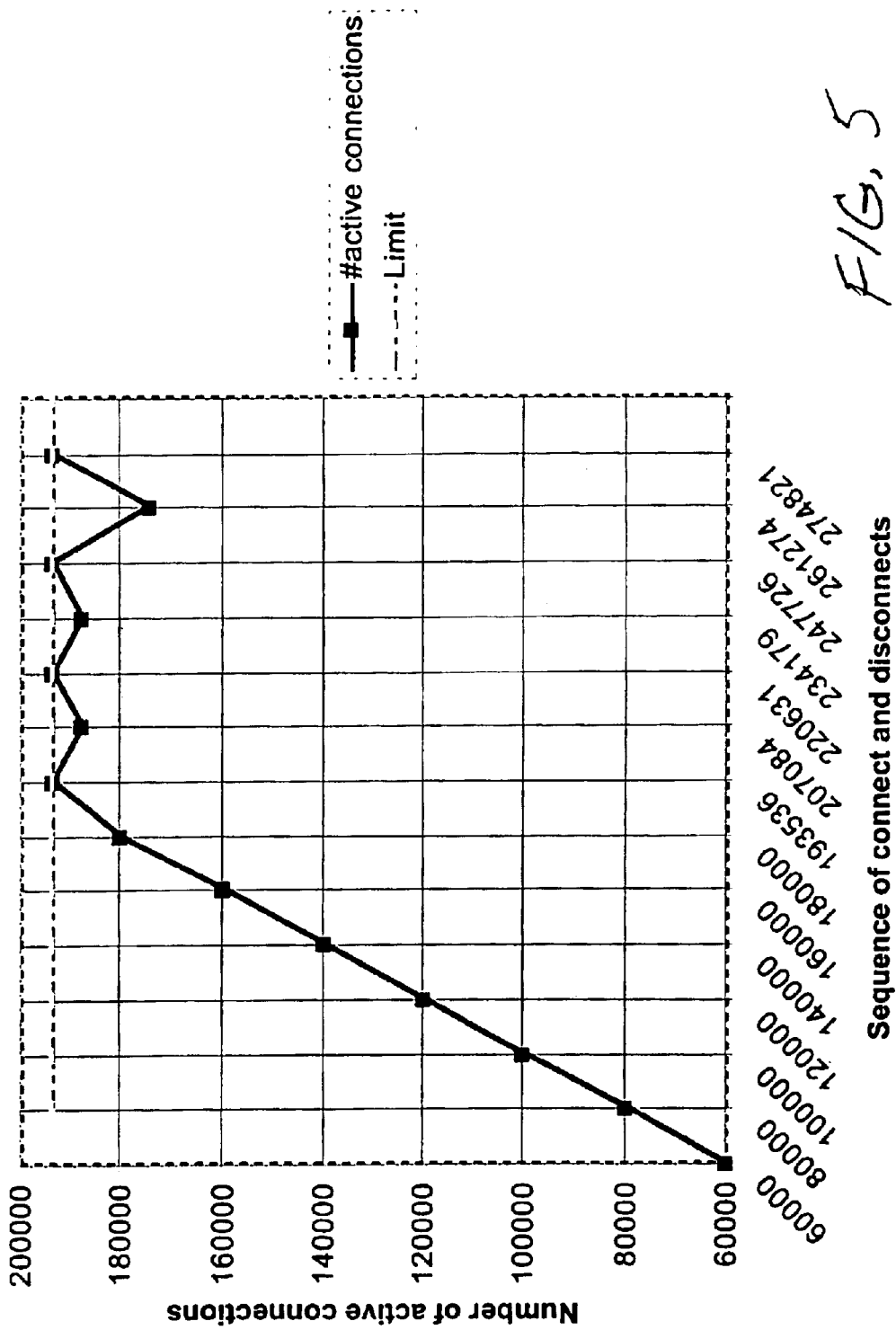
FIG. 5 is a graph illustrating the non-blocking nature of network utilizing the marching algorithm of the invention.

As illustrated and described below with reference to FIG. 5, the marching algorithm of the invention enables full utilization of the network. This results in minimal amount of switch elements and fabric cost as it requires no expansion in the middle stage either in terms of the number of switch elements or the number of timeslots on links connecting to the middle stage.

An additional benefit of the invention is the reliability of a single plane switch. Normally two parallel switch planes are provided for backup in case of the failure of any connection in the primary switch plane. Failure in one plain triggers a switch over to the back-up fabric. In the absence of such an arrangement, for single plane operation, the marching algorithm provides a backup solution. Given that the load is focused on certain switch elements in the middle stage switch, the non-loaded switch elements $\{\ldots, k_{r-1}, k_r\}$, may act as backup switch elements. As shown in FIG. 4, on failure of a switch element at 200, the position of the switch elements is swapped in the forward and reverse marching sequence at 202. This is followed by a re-arrangement of the connections from the failed to the working switch element at 204. This, in effect, creates a 1 for r redundancy scheme. This approach can iterate with further failures.

A second embodiment of the invention, suitable for multi-rate connections, is similar to the first embodiment.

In practical implementations multi-rate connections are often reduced to the case of multiple single rate connections using what is known as a virtual connection. A multi-rate virtual connection with rate d, is treated as d single rate connections, each routed independently through the middle stage switch fabric. These connections are then recombined in the output stage. Thus, the second embodiment of the invention simply applies the first embodiment to multi-rate virtual connections.

With this approach, however, a disconnect of a virtual connection with rate d, will result in re-arrangement of d single rate connections. In the prior art, a back to back connection request typically waits for the results of all the rearrangements. However, the marching algorithm of the present invention provides non-blocking of the network up to its full capacity. Therefore, provided there is sufficient capacity for the new connection, it may be given priority and occur prior to a complete disconnect and the resulting rearrangements.

A software simulation model of a three stage Clos Network v(m, n, r) was used to verify the algorithm of the invention. The model created was an n=m=r=12 network, resulting in 36 switch elements in the network. The number of timeslots R in a row was set to 1344 in all simulated scenarios. It was assumed that any input slot may be switched to any idle out going timeslot. In practice some constraints may be imposed on the number of contiguous input timeslots that may be destined to the same outgoing row. Connection management software often keeps track of such rare events and uses a lateral shift of the timeslot on the incoming row to resolve the constraint.

Using this model, a switch element in the first stage may generate up to r×R connection requests that are randomly destined to any of the idle r×r×R time slots in the third stage. Using Ohta's notation, a switch element I in the first stage requests a connection to switch element J, in the third stage. This request is routed through a middle stage switch element K. The number of such active connections is represented by C(I, J, K).

According to the model, a connection set-up request is generated by randomly selecting a pair of input and output switch elements I, J. If the path hunt is successful through middle stage switch K, the connection is accepted. Otherwise a network-blocking instance has occurred and is noted. Connections are stored in a connection table and may be taken down based on any desired scheme.

Once a disconnect request is issued for connection $(I, J, K)_x$, a single connection rearrangement occurs. This involves selection of a connection $(I, J, K')_y$. Connection y is copied over to the timeslot taken by connection x. K' may be the same as K, in which case a simple disconnect occurs.

Once a switch element in the first or third stage is fully loaded, i.e. all its r×R timeslots are busy and connected, that switch element is temporarily removed from the list of contending first or third stage switch elements. This ensures that the pseudorandom number generator always selects switch elements that have idle timeslots. Fully loaded switch elements may rejoin the list of contending switch elements once they have idle timeslots.

A ramp up is an arbitrary sequence of connection set-ups with no intervening disconnects. A ramp down is an arbitrary sequence of connection disconnects with no intervening connection set-ups. The length of the ramp-up, or ramp-down, sequence is determined by a load generation algorithm.

The simulated network can terminate 12×12×1344 connections (193,536) when fully utilized. If the number of active connections is C when a connection blocking occurs, then the actual network capacity at blocking is noted to be $\alpha=C/L$ where L is the maximum number of connections. Thus, the probability of blocking is then defined as $\beta=1-\alpha$.

In order to verify the simulator, the prior art semi-rearrangeable algorithms were tested first. The results were consistent with the expected results for the prior art algorithms.

The marching algorithm of the present invention was then tested in the same simulated network. Several load patterns where generated and all resulted in non-blocking operation. The sequence of connect and disconnects was arbitrary and the choice of (I, J) pairs was made randomly. The ramp-up and ramp-down sequences are shown in FIG. 5. The limit of 12×12×1344=193,536 connections is shown by the dashed line at the top of FIG. 3. As can be seen in FIG. 3, the simulation exhibits an $\alpha=1$ and a $\beta=0$. The forward and reverse marching sequence break any correlations that may exist between input/output connection patterns and hence no known pathologies exist that would break the non-blocking operation up to full capacity.

The first and the primary improvement due to the marching algorithm of the invention is the resulting non-blocking operation of the network with no expansion in the middle stage. This remains true for full capacity of the first and the third stage of the network and for an arbitrary sequence of requests for connect and disconnect pairs. This results in hardware savings and simple, well defined control algorithms having a known order of complexity.

The second benefit of the invention is that the algorithm can be implemented in a distributed fashion. This allows the construction of large multi-terabit non-blocking networks.

The third benefit of the invention is that the forward marching sequence, together with the re-arrangement based on disconnects using the reverse sequence, ensure that there is always the largest possible number of contiguous slots available to set up a large multi-rate connection.

The fourth benefit of the invention is the reliability aspect for single plane switch operation.

The fifth benefit of the invention is that the marching algorithm can also work in a similar fashion for larger switching fabrics and networks having five or more stages.

There have been described and illustrated herein several embodiments of a marching algorithm selecting middle stage switch elements in a Clos network. While particular embodiments of the invention have been described, it is not intended that the invention be limited thereto, as it is intended that the invention be as broad in scope as the art will allow and that the specification be read likewise. Thus, while the invention was illustrated in a three stage network, it is applicable to networks having more states. Also, while the marching sequence was illustrated as a top to bottom in order sequence. Any sequence could be used so long as the same sequence is repeated and is used by all of the first stage switch elements. It will therefore be appreciated by those skilled in the art that yet other modifications could be made to the provided invention without deviating from its spirit and scope as so claimed.

What is claimed is:

1. A method for selecting middle stage switch elements in a Clos network having input, output, and middle stage switch elements, said method comprising:
   a) defining a marching sequence of the middle stage switch elements;
   b) upon receiving a connection request at an input stage switch element, examining the middle stage switch elements to find a middle stage switch element through which a connection can be made to a desired output stage switch element, said step of examining proceeding according to the marching sequence; and
   c) upon a disconnect, hunting for a rearrangeable connection by examining the middle stage switch elements using the marching sequence in reverse, wherein
      said marching sequence assures that the middle stage switch elements are selected in such a way that blocking of connections is avoided.

2. A method according to claim 1, wherein:
all input stage switch elements use the same marching sequence.

3. A method according to claim 1, further comprising:
   d) after finding a rearrangeable connection, copying the rearrangeable connection to a new route before releasing the old route.

4. A method according to claim 3, wherein:
the rearrangeable connection is copied to the route previously used by the connection which was disconnected.

5. A method according to claim 1, wherein:
the method is distributed among the input stage switch elements.

6. A method according to claim 1, wherein:
each input stage switch element is provisioned with forward and reverse marching sequences.

7. A method according to claim 6, wherein:
each input stage switch element hunts for connection paths independently of all other input stage switch elements.

8. A method according to claim 7, wherein:
the input stage switch elements fill connection requests based on knowledge of availability of timeslots at the middle stage switch elements for the desired destination.

9. A method of finding a connection path in a Clos network having an equal number of switch elements at each stage, said method comprising:
   a) defining a marching sequence for searching path availability;
   b) in response to a connection request, following the marching sequence such that the network is filly utilized and connections are not blocked; and
   c) in response to a disconnect, finding a rearrangeable connection by following the marching sequence in reverse.

10. A method according to claim 9, wherein
the method is distributed among first stage switch elements.

11. A method according to claim 9, wherein:
each first stage switch element is provisioned with forward and reverse marching sequences.

12. A method according to claim 11, wherein:

each first stage switch element hunts for connection paths independently of all other first stage switch elements.

13. A method according to claim 12, wherein:

the first stage switch elements fill connection requests based on knowledge of availability of timeslots at the middle stage for the desired destination.

14. A Clos network, comprising:

a) a plurality of input stage switch elements;

b) a plurality of middle stage switch elements coupled to said input stage switch elements; and c) a plurality of output stage switch elements coupled to said middle stage switch elements, wherein each of said input stage switch elements has means for receiving a connection request and means for selecting a middle stage switch element from said plurality of middle stage switch elements to complete the connection requested, upon receiving a connection request, an input stage switch element examines said middle stage switch elements according to a marching sequence to find a middle stage switch element through which the requested connection can be made, said marching sequence assuring that said middle stage switch elements are selected in such a way that blocking of connections is avoided, each of said input stage switch elements has means for detecting a disconnect, and upon detecting a disconnect, an input stage switch element hunts for a rearrangeable connection by examining said middle stage switch elements using the marching sequence in reverse.

15. A Clos network according to claim 14, wherein:

all input stage switch elements use the same marching sequence.

16. A Clos network according to claim 14, wherein:

each input stage switch element has means for copying a rearrangeable connection to a new route, and after finding a rearrangeable connection, an input stage switch element copies the rearrangeable connection to a new route before releasing the old route.

17. A Clos network according to claim 16, wherein:

the rearrangeable connection is copied to the route previously used by the connection which was disconnected.

18. A Clos network according to claim 14, wherein:

each input stage switch element is provisioned with forward and reverse marching sequences.

19. A Clos network according to claim 18, wherein:

each input stage switch element hunts for connection paths independently of all other input stage switch elements.

20. A Clos network according to claim 19, wherein:

said input stage switch elements fill connection requests based on knowledge of availability of timeslots at the middle stage for the desired destination.

21. A Clos network, comprising:

a) a plurality of input stage switch elements;

b) a plurality of middle stage switch elements coupled to said input stage switch elements, the number of middle stage switch elements being equal to the number of input stage switch elements; and c) a plurality of output stage switch elements coupled to said middle stage switch elements, the number of output stage switch elements being equal to the number of middle stage switch elements, wherein each of said input stage switch elements has means for receiving a connection request and means for selecting a middle stage switch element from said plurality of middle stage switch elements to complete the connection requested by following a marching sequence, the network is fully utilized and connections are not blocked, and each of said input stage switch elements has means for detecting a disconnect, and in response to the disconnect, finding a rearrangeable connection by following the marching sequence in reverse.

22. A Clos network according to claim 21, wherein:

each input stage switch element is provisioned with forward and reverse marching sequences.

23. A Clos network according to claim 22, wherein:

each first stage switch element hunts for connection paths independently of all other first stage switch elements.

24. A Clos network according to claim 23, wherein:

the input stage switch elements fill connection requests based on knowledge of availability of timeslots at the middle stage for the desired destination.

* * * * *